(12) United States Patent
Brown et al.

(10) Patent No.: US 8,685,151 B2
(45) Date of Patent: Apr. 1, 2014

(54) MULTIPLE FIXED-FLUIDIZED BEDS FOR CONTAMINANT REMOVAL

(71) Applicant: Lummus Technology Inc., Bloomfield, NJ (US)

(72) Inventors: Ronald E. Brown, Collinsville, OK (US); Daniel T. Fernald, Friendswood, TX (US)

(73) Assignee: Lummus Technology Inc., Bloomfield, NJ (US)

( * ) Notice: Subject to any disclaimer, the term of this patent is extended or adjusted under 35 U.S.C. 154(b) by 0 days.

(21) Appl. No.: 13/958,815

(22) Filed: Aug. 5, 2013

(65) Prior Publication Data

US 2013/0312611 A1 Nov. 28, 2013

Related U.S. Application Data

(63) Continuation of application No. 12/551,190, filed on Aug. 31, 2009, now Pat. No. 8,500,851.

(60) Provisional application No. 61/113,100, filed on Nov. 10, 2008.

(51) Int. Cl.
*B01D 53/02* (2006.01)

(52) U.S. Cl.
USPC ............... 96/121; 96/122; 96/123; 96/130; 95/108; 95/135; 95/136; 95/137

(58) Field of Classification Search
USPC ............ 95/108, 135–138; 96/121–123, 130
See application file for complete search history.

(56) References Cited

U.S. PATENT DOCUMENTS

| | | |
|---|---|---|
| 2,617,986 A | 11/1952 | Miller |
| 2,923,679 A | 2/1960 | Thompson |
| 3,448,561 A | 6/1969 | Franklin et al. |
| 3,620,969 A | 11/1971 | Turnock et al. |
| 3,632,445 A | 1/1972 | Barre |
| 3,944,400 A | 3/1976 | Bird |
| 4,046,530 A | 9/1977 | Izumo et al. |
| 4,205,458 A | 6/1980 | Austin |
| 4,312,640 A | 1/1982 | Verrando |
| 4,359,592 A | 11/1982 | Chao et al. |
| 4,406,775 A | 9/1983 | Bailor et al. |
| 4,425,222 A | 1/1984 | Swan |
| 4,605,425 A | 8/1986 | Verrando et al. |
| 4,629,612 A | 12/1986 | van der Wal et al. |
| 4,655,796 A | 4/1987 | Pirkle, Jr. |
| 5,061,455 A | 10/1991 | Brose et al. |

(Continued)

FOREIGN PATENT DOCUMENTS

| | | |
|---|---|---|
| DE | 3115734 A1 | 10/1982 |
| DE | 4020246 A1 | 1/1992 |

OTHER PUBLICATIONS

Notice of Reasons for Rejection (w/translation) issued Jul. 30, 2013 in corresponding Japanese application No. 2011-535578 (11 pages).

(Continued)

*Primary Examiner* — Christopher P Jones
(74) *Attorney, Agent, or Firm* — Osha • Liang LLP (57) ABSTRACT

The present disclosure relates generally to contaminant removal from gas streams. In certain embodiments, the present disclosure relates to a process for removing one or more contaminants from a gas stream via contact with a regenerable sorbent at high temperature and pressure, utilizing a unique arrangement of reactors operating in parallel.

8 Claims, 3 Drawing Sheets

(56) References Cited

U.S. PATENT DOCUMENTS

| | | | |
|---|---|---|---|
| 5,264,644 | A | 11/1993 | Hudson et al. |
| 5,451,249 | A | 9/1995 | Spiegel et al. |
| 5,526,582 | A | 6/1996 | Isaksson |
| 5,726,117 | A | 3/1998 | Khare et al. |
| 5,755,857 | A | 5/1998 | Acharya et al. |
| 5,980,846 | A | 11/1999 | Tatani et al. |
| 6,306,793 | B1 | 10/2001 | Turk et al. |
| 6,544,410 | B1 | 4/2003 | Gislason et al. |
| 6,656,877 | B2 | 12/2003 | Sughrue et al. |
| 6,878,669 | B2 | 4/2005 | Gislason et al. |
| 6,914,033 | B2 | 7/2005 | Gislason et al. |
| 7,063,732 | B2 | 6/2006 | Katikaneni et al. |
| 7,182,918 | B2 | 2/2007 | Hoover et al. |
| 7,309,416 | B2 | 12/2007 | Fokema et al. |
| 7,682,424 | B2 | 3/2010 | Schmidt et al. |
| 2003/0114296 | A1 | 6/2003 | Gislason et al. |

OTHER PUBLICATIONS

Patent Abstracts of Japan, Publication No. 02-075320; date of publication Mar. 15, 1990.
Patent Abstracts of Japan, Publication No. 55-044363; date of publication Mar. 28, 1980.
Patent Abstracts of Japan, Publication No. 51-138703; date of publication Nov. 30, 1976.
Patent Abstracts of Japan, Publication No. 60-228935; date of publication Nov. 14, 1985.
K. Jothmurugesan et al., "Advanced Hot'Gas Desulfurization Sorbents" Advanced Coal-Based Power and Environmental Systems '97 Conference; Jul. 22-24, 1997; Pittsburg, PA; Research Sponsored by the U.S. Department of Energy Contract No. DE-FG21-94MC31393.
S.K. Gangwal et al.; "Slipstream Testing of the Direct Sulfur Recovery Process"; Conference: "Coal-Fired Power Systems 94—Advances in IGCC and PFBC"; Jun. 21-23, 1994; pp. 246-255; Research Sponsored by the U.S. Dept. of Energy Contract No. DE-AC21-93MC30010.
E.L. Moorehead et al.; "Hot Gas Desulfurization Using Transport Reactors"; The M.W. Kellogg Technology Company; 1996; Research sponsored byt eh U.S. Department of Energy's Morgantown Energy Technology Center, under cooperative Agreement No. DE-FC21-92MC29309.
R.E. Ayala et al.; "Hot Gas Desulfurization Using Moving-Bed Reactor"; GE Corporate Research and DEvelopment; 1997, Research sponsored by teh U.S. Department of Energy's Morgantown Energy Technology Center, under Contract No. DE-AC21-94MC31089.
R.V. Siriwardane et al., "Durable Zinc Oxide-Based Regenerable Sorbents for Desulfurization of Syngas in a Fixed-Bed Reactor" 2002, U.S. Dept. of Energy and Research Triangle Institute; Research sponsored by the U.S. Department of Energy.
S.K. Gangwal et al.; Warm Gas Desulfurization Process for Chevon Texaco Quench Gasifier Syngas; 2004; RTI International; Research Sponsored by tjheU.S. Dept. of Energy Contract No. DE-AC26-99FT40675.
M.F. Cesario et al.; "A Novel H2S Sorbent for Entrained/Fluidized Bed Reactors"; TDA Research, AIChe 200 Spring National Meeting; Atlanta, GA; Mar. 5-9, 2000.
J. Schlather et al.; "Comparison of a New Warm-Gas Desulfurization Process Versus Traditional Scrubbers for a Commercial IGCC Power PLant." Gasification Technologies Conference, Oct. 17, 2007, San Francisco, CA.

FIG. 3

MULTIPLE FIXED-FLUIDIZED BEDS FOR CONTAMINANT REMOVAL

CROSS-REFERENCE TO RELATED APPLICATION

The present application is a continuation application, and claims benefit pursuant to 35 U.S.C. §120 of U.S. patent application Ser. No. 12/551,190, filed on Aug. 31, 2009, now U.S. Pat. No. 8,500,851, which is incorporated by reference in its entirety, and which claims priority under 35 U.S.C. §119 to U.S. Provisional Patent Application No. 61/113,100, filed Nov. 10, 2008, which is hereby incorporated by reference in its entirety.

FIELD OF THE DISCLOSURE

The present disclosure relates generally to contaminant removal from gas streams. In certain embodiments, the present disclosure relates to a process for removing one or more contaminants from a gas stream via contact with a regenerable sorbent at high temperature and pressure, utilizing a unique arrangement of reactors operating in parallel.

BACKGROUND OF THE DISCLOSURE

In recent years, methane and other gas-phase fuels have become more popular as a source of energy. One example of this phenomenon is the rapidly increasing use of gasification processes to generate power from energy sources such as coal or biomass. However, tighter governmental regulation have restricted the allowable levels of certain pollutants (e.g., sulfur species, acid gases, and other compounds of environmental concern) resulting from the use of these energy sources. Another problem associated with the presence of reduced sulfur gases (such as $H_2S$, COS and $CS_2$) in gas streams such as fuel gases, flue gases and waste gases arise in that these gases are corrosive, especially toward steel turbine blades. Consequently, the presence of reduced sulfur gases in the fuel gases used to power turbines results in severe blade corrosion. This has prompted fuel gas producers to develop more efficient methods to reduce pollutant emissions that comply with these increased standards.

Known methods of treating a gas stream to remove undesirable components include contacting the gas stream with a physical or chemical solvent. Examples of chemical solvents used for this purpose include amines such as methyldiethanolamine (MDEA) and diethanolamine (DEA). Often, the selectivity of the chemical solvents can be problematic. For example, while amines are capable of efficiently removing hydrogen sulfide ($H_2S$) from gas streams, amines are generally not capable of absorbing other undesirable sulfur-containing compounds, such as, for example carbonyl sulfide (COS). As a result, additional process steps (e.g., COS hydrolysis) must be carried out before the gas stream can be used as fuel. In addition to removing $H_2S$, most amines also remove carbon dioxide, which can place increased loads on subsequent waste gas processing facilities. Amine-based scrubbing processes also have technical problems such as the formation of heat stable salts, decomposition of amines, and are additionally equipment-intensive, thus requiring substantial capital investment.

Most processes for removing sulfur from a syngas stream utilizing chemical solvents require extensive cooling of the incoming gas stream to the range from 38° C. to below 0° C. Sour syngas usually leaves the gasification furnace at a temperature of at least 340° C., so the heat that must be removed in order to perform bulk sulfur removal equals 300° C. or more. This amount of heat removal requires large, expensive heat exchange equipment sometimes made with expensive, high alloy metallurgy. Additional equipment is required to recapture the removed heat by converting water into the large quantities of steam needed to remove absorbed contaminants from the amine solvent. Overall, the process is expensive to both deploy and operate.

Recently, improved techniques employing regenerable solid sorbents have been developed as a more efficient means for removing contaminants from syngas. Such regenerable sorbents are typically formed with a metal oxide component (e.g., ZnO) and a promoter metal component (e.g., Ni). When contacted with a sulfur-containing syngas at a temperature of approximately 375° C., the promoter metal and metal oxide components of the regenerable sorbent cooperate to remove sulfur from the hydrocarbon and store the removed sulfur on/in the sorbent via the conversion of the metal oxide component (e.g., ZnO) to a metal sulfide (e.g., ZnS). The resulting "sulfur-loaded" sorbent can then be regenerated by contacting the sulfur-loaded sorbent with an oxygen-containing regeneration stream.

During regeneration, the metal sulfide (e.g., ZnS) in the sulfur-loaded sorbent is returned to its original metal oxide form (e.g., ZnO) via reaction with the oxygen-containing regeneration stream. Further, during regeneration the promoter metal is oxidized to form an oxidized promoter metal component (e.g., NiO). After regeneration, the sorbent is once again reduced for further desulfurization by contacting it with the hydrogen-containing syngas stream. The oxidized promoter metal component is reduced by the hydrogen gas, thereby returning the sorbent to an optimum sulfur-removing state having a metal oxide component (e.g., ZnO) and a reduced-valence promoter component (e.g., Ni). Following reduction, the reduced sorbent is again competent to react with sulfur contaminants in the syngas.

Traditionally, solid sorbent compositions used in hydrocarbon desulfurization processes have been agglomerates utilized in fixed bed applications. Conventional fixed beds have the advantage of decreasing the attrition rate of the sorbent by immobilizing it, thus providing the longest sorbent lifespan. However, rapid clogging requires frequent regeneration of the fixed bed sorbent, and the required turn-over times are extensive.

Fluidized beds have three main advantages over fixed beds, in that, (1) they can more efficiently distribute the heat of reaction due to the constant mixing of the catalyst bed, (2) the catalyst that becomes inactive can be easily replaced in-situ, and (3) the catalyst has high surface area for maximizing bulk sulfur removal. In a typical fluid bed sorbent system utilizing continuous regeneration, a portion of the sulfur-loaded catalyst is constantly transferred to a separate regeneration vessel, then following regeneration, is returned to the main reactor. This system works well for sulfur contaminant removal from a liquid hydrocarbon feed. However, the relatively high sulfur level (1 to 2%) in a typical syngas feed quickly loads up the catalyst bed with sulfur, requiring a significantly increased rate of catalyst circulation to the regeneration chamber. Generally, attrition of solid particles is increased when solid particles are transported at high velocity. Thus, desulfurization units that employ dilute phase transport of the solid particles through and between vessels can cause significant attrition of the particles. When the solid particles employed in the desulfurization unit experience high levels of attrition, the solid particles must be replaced at frequent intervals, thereby increasing operating cost and downtime of the unit. While not wishing to be bound by theory, this increased rate of attrition may be in part due to increased pressure between adsorbent particles as the recirculating contaminant-removal apparatus is enlarged to the scale required for effective contaminant removal from a commercial syngas stream. In addition, increased sorbent circulation rates become cost-prohibitive at commercial scale due to requisite increases in regeneration reactor capacity (and consequent larger plot size) as well as reduced operational reliability. Finally, these systems are not conducive to maintaining a relatively constant temperature and pressure on the sorbent, thereby accelerating its rate of attrition.

Accordingly, a need exists for a more cost-efficient process for removing contaminants from a gas stream. The invention described herein provides a unique process for removing contaminants from a syngas stream, making it more energy-efficient, less complex, and consequently, less costly.

BRIEF DESCRIPTION OF THE EMBODIMENTS

One embodiment of the invention comprises: (a) contacting an sulfur-containing gas stream with an initial sorbent in an adsorption reactor to thereby produce an sulfur-depleted product stream and a sulfur-laden sorbent, wherein the initial sorbent comprises Zn and a promoter metal; and (b) contacting at least a portion of the sulfur-laden sorbent with a regeneration gas stream in a regeneration reactor under regeneration conditions to thereby produce a regenerated sorbent and an off-gas stream, wherein the contacting of step (b) includes introducing the regeneration gas into the regeneration reactor at an initial standard gas hourly space velocity (SGHSV) in the range of from about 100 to about 100,000 $h^{-1}$, wherein the contacting of step (b) includes increasing the SGHSV of the regeneration gas to a final SGHSV that is at least 1,000 $h^{-1}$ higher than the initial SGHSV.

In certain embodiments of the present invention, there is provided a process comprising: (a) introducing a raw gas stream into an adsorption reactor, wherein the raw gas stream comprises in the range of from about 10 to about 75 volume percent carbon monoxide (CO), in the range of from about 8 to about 50 volume percent hydrogen ($H_2$), in the range of from about 4 to about 40 volume percent water ($H_2O$), and in the range of from about 0.001 to about 5 volume percent hydrogen sulfide ($H_2S$); (b) contacting at least a portion of the raw gas stream with an initial sorbent in the adsorption reactor to thereby produce a product gas stream and a sulfur-laden sorbent, wherein the initial sorbent comprises Zn and a promoter metal; (c) drying at least a portion of the sulfur-laden sorbent to thereby produce a dried sulfur-laden sorbent; and (d) regenerating at least a portion of the dried sulfur-laden sorbent in a regeneration reactor under regeneration conditions to thereby produce a regenerated sorbent and an off-gas stream, wherein the regenerated sorbent comprises less than about 20 weight percent of sorbent-damaging compounds formed during the regenerating of step (d).

In certain embodiments of the present invention, there is provided a process comprising: (a) gasifying a carbon-containing material in a gasification zone to thereby produce an input gas stream, (b) introducing at least a portion of the input gas stream into an adsorption reactor, wherein the adsorption reactor contains an initial sorbent, wherein the initial sorbent comprises Zn, expanded perlite, and a promoter metal, wherein at least a portion of the initial sorbent comprises a substitutional solid solution characterized by the formula $M_ZZn_{(1-Z)}Al_2O_4$ and a substitutional solid metal solution characterized by the formula $M_AZn_B$, wherein M is a promoter metal component and A, B, and Z are in the range of from about 0.01 to about 0.99; (c) adsorbing at least a portion of the sulfur-containing compounds from the raw gas stream in the adsorption reactor with the initial sorbent to thereby produce a sulfur-laden sorbent and a product gas stream, wherein the adsorbing is carried out at a temperature in the range of from about 225 to about 550° C. and a pressure in the range of from about 250 to about 575 pounds per square inch, gauge, (psig), wherein the sulfur-laden sorbent has a sulfur loading in the range of from about 1 to about 27 weight percent, wherein the product gas stream comprises less than 50 ppmv of sulfur-containing materials and less than 20 ppmv of HCl; (d) drying at least a portion of the sulfur-laden sorbent in a drying zone to thereby produce a dried sulfur-laden sorbent; (e) regenerating at least a portion of the dried sulfur-laden sorbent in a regeneration zone via contact with a regeneration gas under regeneration conditions to thereby produce a regenerated sorbent and a $SO_2$-containing off-gas, wherein the regeneration gas has an initial standard gas hourly space velocity (SGHSV) in the range of from about 1,000 to about 80,000 $h^{-1}$, wherein the regenerating is carried out with an initial temperature in the range of from about 300 to about 600° C.; (f) returning at least a portion of the regenerated sorbent to the adsorption reactor, wherein the regenerated sorbent returned to the adsorption reactor comprises a substitutional solid metal oxide solution characterized by the formula $M_XZn_YO$, wherein M is a promoter metal component and X and Y are in the range of from about 0.01 to about 0.99, wherein the regenerated sorbent has a sulfur loading of less than 6 weight percent, wherein the regenerated sorbent comprises less than 20 weight percent of sorbent-damaging compounds created during the regenerating of step (e); and (g) routing at least a portion of the $SO_2$-containing off-gas stream to a Claus unit.

Certain embodiments of the present invention includes a process for removing contaminants from a hydrocarbon gas, comprising the steps of: contacting a gas stream containing sulfur compounds with an initial sorbent within a temperature range between 285-455° C. and a pressure range between 300-800 psig, in one of several adsorption reactors that operate independently, to thereby produce a sulfur-depleted product stream and a sulfur-laden sorbent, wherein said initial sorbent comprises Zn and a promoter metal; and containing said initial sorbent within each adsorption reactor in a fluidized state; and independently removing one or more of the adsorption reactors from the gas stream containing sulfur compounds in order to regenerate the initial sorbent; and contacting at least a portion of said sulfur-laden sorbent with a regeneration gas stream in a regeneration reactor, while maintaining the temperature within the regeneration reactor in a range between 450-565° C. and a pressure range between 20-300 psig, to thereby produce a regenerated sorbent and an off-gas stream.

Certain embodiments of the present invention, a group of three reactors are simultaneously operated in parallel, with one reactor being in adsorption mode, while the other two are either in adsorption or regeneration mode. However, at least one of the three reactors is in regeneration mode at any given time. In yet another embodiment of the present invention, a group of four reactors are operated simultaneously in parallel, with one reactor being in adsorption mode, while the other three are either in adsorption or regeneration mode. However, at least one of the four reactors is in regeneration mode at any given time.

Certain embodiments of invention described herein comprise at least two swing-type reactors, each having a self-contained, fluidized sorbent bed that combines the strengths of both fixed-bed and fluidized bed reactors into a unique configuration. Once the sorbent in a first reactor is loaded with contaminants and contaminant removal efficiency decreases, the syngas feed to the desulfurization reactor is diverted to one (or more) additional swing reactors operating in parallel with the first, while the first reactor is switched to regeneration mode. The sorbent catalyst is regenerated in the presence of oxygen (air) while maintaining high temperature and pressure conditions.

BRIEF DESCRIPTION OF THE DRAWINGS

Advantages of the present invention will become apparent to those skilled in the art with the benefit of the following description and upon reference to the accompanying drawings.

The invention is susceptible to various modifications and alternative forms, specific embodiments thereof are shown by way of example in the drawings. The drawings may not be to scale. It should be understood that the drawings and their accompanying detailed descriptions are not intended to limit the scope of the invention to the particular form disclosed, but rather, the intention is to cover all modifications, equivalents and alternatives falling within the spirit and scope of the present invention as defined by the appended claims.

DETAILED DESCRIPTION OF THE EMBODIMENTS

The current disclosure builds upon the complete disclosures of U.S. Pat. No. 7,182,918 B2, U.S. Pat. No. 6,656,877 B2, U.S. Pat. No. 6,878,669 B2, and U.S. patent application Ser. No. 11/862,013, the entire disclosures of which are incorporated herein by reference.

Figure 1:
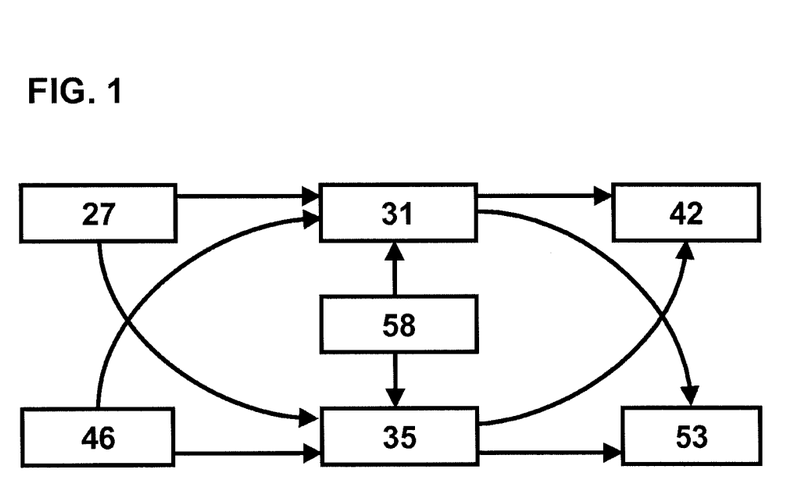
FIG. 1 is a flow diagram of a contaminant removal system in accordance with an embodiment of the present disclosure, wherein two adsorption/regeneration reactors operate in parallel to remove contaminants from an input gas stream while minimizing pressure and temperature cycling on the sorbent bed contained within each reactor. The resultant clean product gas is delivered to a Product Gas User, while contaminant laden gas produced during sorbent regeneration is delivered to an Off-Gas User.

The contaminant removal system of the current disclosure is illustrated by the flow diagram of FIG. 1, and basically comprises a particulate-free input gas source 27, at least two adsorption/regeneration reactors operating in parallel 31, 35, a product gas user 42, and a regeneration off-gas user 53. A fluidized sorbent is contained within each of the reactors, and as the input gas 27 enters a reactor 31 or 35, it contacts this sorbent, thereby creating a contaminant-laden sorbent and a contaminant-depleted product gas. The product gas stream exits the reactor 31 or 35 and is routed to product gas user 42. Once the sorbent is laden with contaminants and can no longer effectively remove contaminants from the input gas, the contaminant-laden sorbent is regenerated via contact with a regeneration gas 46. The resulting off-gas stream exiting the reactor during regeneration mode is routed to an off-gas user 53, while at least a portion of the regenerated sorbent is subsequently re-used for further rounds of adsorption. For example, a first reactor 31 in adsorption mode receives input gas and removes contaminants from the gas stream, while simultaneously, a second reactor 35 is in sorbent regeneration mode, utilizing a regeneration gas comprising a mixture of heated and pressurized inert gas and air 46 to regenerate the catalyst. A subsequent purging step with a pressurized inert gas (such as $N_2$ or $CO_2$, for example) 58 decreases $O_2$ levels within the reactor to a safe level for returning the reactor to adsorption mode. The second reactor 35 is then returned to adsorption mode by resuming the input of pressurized and heated particulate-free input gas 27. Once the reactor 35 is returned to adsorption mode, the contaminant-laden sorbent in the first reactor 31 is regenerated following the same procedure described above for the second reactor. A critical feature of this contaminant removal process and system is that pressure and temperature cycling within each reactor is minimized during cycling between adsorption and regeneration modes. This significantly decreases sorbent attrition rate, and thus, increases the efficiency of contaminant removal.

Figure 2:
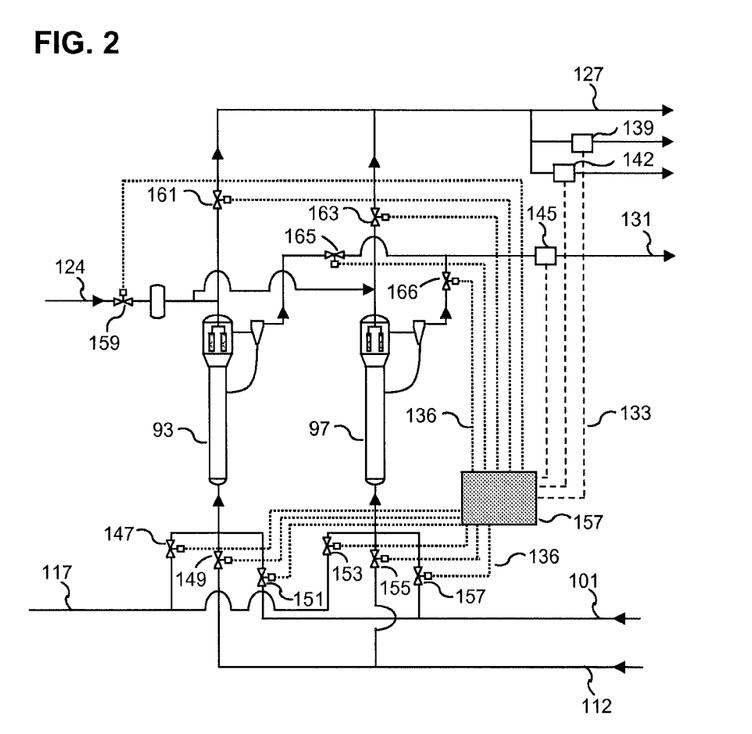
FIG. 2 is a simplified schematic in accordance with an embodiment of the present disclosure that employs two adsorption/regeneration reactors that operate in parallel to remove contaminants from an input gas stream while minimizing pressure and temperature cycling on the sorbent bed contained within each reactor.

FIG. 2 is a more detailed schematic representation of one embodiment of the current disclosure that utilizes two adsorption/regeneration reactors 93 and 97. These reactors operate in parallel, and each reactor contains a fluidized bed of an initial sorbent. In certain embodiments, an electronic control system 167 may monitor the adsorption and regeneration processes occurring in the multiple reactors using input from several photometric analyzers 139, 142, 145. In response to this input, the control system sends electrical signals to electrically-actuated solenoid valves 147, 149, 151, 153, 155, 157, 159, 161, 163, 165, 166, that control the flow of gases into and out of the multiple reactors. Overall, the electronic control system regulates cycling between adsorption mode and regeneration mode for each reactor, thereby minimizing thermal and pressure variations on the sorbent catalyst bed during the cycling. The control system also insures operational safety in the adsorption/regeneration process described herein.

In certain embodiments of the present invention, the process of cycling between adsorption and regeneration phases for each individual reactor is as described below, with certain described components being depicted in FIG. 2. The initial start up process begins with pre-adsorption mode, comprising the pressurization of a first reactor 93 using a heated inert gas 117, such as $N_2$ or $CO_2$. A solenoid valve 147 is opened to allow entry of the inert gas into the reactor, and heating and pressurization continue until the fluidized sorbent bed contained within the reactor reaches a suitable temperature (between 285° C. and 455° C.) and pressure (between 300 and 800 psig) for adsorbing contaminants from an input gas stream.

Adsorption mode begins with the closing of the inert gas valve 147 and the opening of the particulate-free input gas valve 151, allowing contaminants to be adsorbed from the hot and pressurized input gas by the fluidized sorbent contained within the first reactor. The reactor output valve 161 is allowed to open soon thereafter, with output product gas being directed to a product gas user. During adsorption mode, the temperature in the reactor is maintained in a range between 285° C. and 455° C. and a pressure in the range between 300 and 800 psig. Once photometric analyzers located downstream from the reactor 139, 142 indicate an increase in the levels of contaminants in the product gas above a threshold indicative that the sorbent is loaded with contaminants, pre-regeneration mode begins. In some embodiments, other indicating variables may be used to determine when pre-regeneration mode begins, such as the availability of other parallel reactors operating in pre-adsorption mode and ready to begin adsorption mode.

Pre-regeneration mode begins by opening a valve 147 to allow a high-pressure, heated inert gas 117 into the reactor, while simultaneously closing a valve 151 to reduce the influx of contaminant-laden, particulate-free input gas 101. The reduced flow of input gas into the first reactor is immediately diverted to a second reactor 97 that has been held in pre-adsorption mode at high pressure and temperature. This process continues until the full flow of input gas is diverted to the second reactor 97, while the first reactor is then purged with an inert gas 117 at a temperature ranging between 285° C. and 455° C. and a pressure in the range between 300 and 800 psig. This step may also allow the sorbent to dry prior to regeneration.

Once the reactor is purged with an inert gas to an acceptable level, the transition from pre-regeneration mode to regeneration mode begins with the closure of the purge gas inlet valve 147. In some embodiments, a purge valve can be opened to release excess pressure 165. An inlet valve is opened 149 allowing the introduction of a mixture of inert gas and air for regeneration of the adsorbent. A valve is then opened 165 such that the output gas from the reactor is directed to an off-gas user 131 for further clean-up of $SO_2$ and other contaminants liberated from the regenerated adsorbent. During this regeneration process, the reactor temperature is maintained at a temperature in the range between 455° C. and 565° C., and a pressure in the range between 20 and 300 psig.

Once the data obtained from downstream regeneration analyzer 145 indicates that the sorbent is regenerated to an acceptable extent (indicated by a large drop in $SO_2$ levels in the off-gas), the reactor is then once again switched to pre-adsorption mode by progressively closing the air/inert gas inlet valve 149 while progressively opening the purge gas inlet valve 159. Output from the reactor is then directed to a residual contaminant treatment process, a gasification process, or to flare (not depicted). During purge mode, the reactor is maintained at a temperature ranging between 285° C. and 455° C. and a pressure ranging between 300 and 800 psig until such time as the reactor is returned to adsorption mode.

In certain alternative embodiments, a group of three reactors are simultaneously operated in parallel, with one reactor being in adsorption mode, while the other two are either in adsorption or regeneration mode. In other alternative embodiments of the current disclosure, a group of four reactors are operated simultaneously in parallel, with one reactor being in adsorption mode, while the other three are either in adsorption or regeneration mode. However, at least one of the four reactors is in regeneration mode at any given time.

In certain embodiments, the cycling between adsorption and regeneration mode for the multiple reactors operating in parallel is controlled by an electronic control system 167. The electronic control system includes a computer processor that receives data from various in-line sensors that may comprise commercially-available continuous photometric analyzers 139, 142, 145. The data input from these analyzers is transmitted either wirelessly or via a wired connection 133 and processed by the computer processor of the electronic control system according to defined parameters pre-programmed onto a computer-readable medium. The defined parameters are in accordance with the process of the current disclosure, and provide an instruction set readable by the computer processor. This allows the electronic control system to readily compare the data from the various sensors with expected values, then respond by sending signals to electrically-actuated double block solenoid valves 147, 149, 151, 153, 155, 157, 159, 161, 163, 165, 166 that regulate the entry of syngas, purge gas, and regeneration gas to each reactor, as well as exit of contaminant depleted product gas, off-gas, and regeneration off gas. The electronic control system 167 also prevents unsafe operating conditions. For example, the control system prevents opening the syngas feed into a particular adsorption zone unless the oxygen level (as measured with photometric analyzers) is below explosive limits. In some embodiments, redundant analyzers are utilized, with the data from multiple analyzers compared by the control system to ensure safe operation before a valve is opened.

Figure 3:
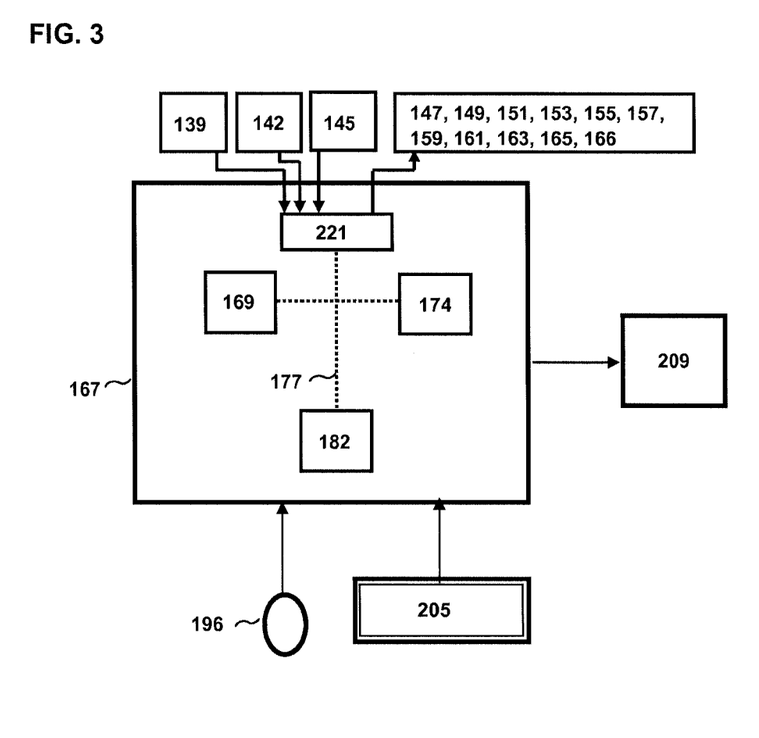
FIG. 3 is a schematic of an embodiment of the present disclosure that provides a more detailed view of the Electronic Control System 167 depicted in FIG. 2.

A more detailed representation of the electronic control system present in certain embodiments is illustrated in FIG. 3. In certain embodiments, the electronic control system 167 includes a processor 169, system memory 174, and a system communications bus 177 that couples various system components including system memory 174 to processor 169. System memory 174 may comprise read-only memory (ROM) and/or random access memory (RAM). The electronic control system 167 may further include a computer readable media 182, which provides storage for computer readable instructions, data structures, program modules, data, and the like. A user (not shown) may enter commands and information into the electronic control system 167 through input devices such as a keyboard 205, a mouse 196. Display device 209 may also include other devices such as a touch screen, a light pen, a grid of light beams, or the like for inputting information into processor 169. A display device 209, such as a monitor, a flat panel display, or the like is also connected to the control system 167 for output. Communications device 221, which in one embodiment is a modem, provides for communications with one or more sensors 139, 142, 145 that in certain embodiments comprise photometric or galvanic analyzers. Processor 169 can be programmed with instructions to interact with other computing systems so as to perform the methods described below. The instructions may be stored in memory 174 and/or computer readable media 182. Processor 169 may be loaded with any one of several commercially available computer operating systems, as would be known to a person having ordinary skill in the art. The electronic control system 167 may utilize a communications device 221 to receive input from various sensors 139, 142, 145 and to control the operation of at least two electrically-actuated solenoid valves 147, 149, 151, 153, 155, 157, 159, 161, 163, 165, 166. Communications device 221 may comprise a modem in certain embodiments, and communicate with said sensors and solenoid valves either directly or via a computer network. Said network may be the Internet, a local area network, a wide area network, or the like.

Preferred embodiments of the present invention comprise a unique and unexpectedly efficient process in part due to the inclusion of a variety of elements. However, it must be emphasized that these elements alone do not the comprise the invention. Rather, they facilitate the implementation of additional aspects of the invention, including the consistent maintenance of a high-pressure and high-temperature environment that minimizes sorbent attrition as well as sorbent regeneration time. Additional elements of the invention, such as its automated control system, also increase the overall efficiency of the process.

The input gas source can comprise any source or system capable of producing a gas stream. In general, the raw input gas stream can have a vapor fraction greater than about 0.8, greater than about 0.9, or greater than 0.95 at standard conditions. In one embodiment, the raw input gas stream can comprise less than about 1 volume percent, less than about 0.5 volume percent, less than 0.05 volume percent, or less than 500 parts per million by volume (ppmv) of $C_6$+ hydrocarbon material. For example, raw input gas source can comprise a natural gas well, a refinery or chemical plant process stream, or any other suitable source. One embodiment (1) utilizes a self-contained fluidized sorbent bed, which is more efficiently regenerated for reuse than a fixed sorbent bed due to easier access to the sorbent, and (2) maintaining temperature levels inside the swing reactor within defined ranges during both adsorption and regeneration cycles, thereby preventing the catalyst from cooling below carbon ignition temperatures when cycling between regeneration mode from adsorption mode, and (3) maintaining pressure levels during regeneration so as to minimize the time needed for re-pressurizing the reactor prior to re-entering adsorption mode.

Certain preferred embodiments of the current invention remove contaminants from an input gas stream. The efficiency of sulfur removal increases over higher velocity transport systems because of the residence time (back-mixing of a dense phase fluid bed) versus a less dense phase transport system. Experimentation has shown that a contaminant removal system based on continuous transport and regeneration of adsorbent will likely yield only a ~10 ppm sulfur in product gas when synthesis gas from a coal gasifier is used as input. However certain embodiments of the current invention should remove all but 1-2 ppm sulfur in the product gas, or even lower.

In one embodiment, the particulate-free input gas source can comprise a gasification system operable to produce a raw gas stream via the gasification of a solid-based carbon-containing material, such as, for example, coal or petroleum coke. Typically, the solid carbon-containing material can be gasified via contact with a gasification stream comprising steam, oxygen, air, hydrogen, carbon dioxide, or any combination thereof. In one embodiment, a slurry of solid carbon-containing material in a conduit can be gasified via contact with an oxygen-containing stream entering via said conduit at a temperature in the range of from about 530 to about 1950° C., about 810 to about 1650° C., or 950 to 1510° C. and a pressure in the range of from about 150 to about 800 psig, about 250 to about 700 psig, or 300 to 600 psig.

This design increases the overall efficiency of the contaminant removal process by (1) reducing the overall capital expenditure needed to implement the process, (2) extending sorbent lifespan by reducing the magnitude of temperature and pressure variations that occur during the cycling of the sorbent between adsorption and regeneration modes, and (3) maximizing the efficiency of the adsorption process for a given amount of sorbent by utilizing high temperature and pressure during adsorption, and (4) minimizing the time needed for regeneration of the sorbent by using a self-contained, fluidized sorbent bed, rather than a fixed sorbent bed.

The raw gas stream exiting the gas source via a conduit can comprise one or more of the following compounds: carbon monoxide (CO), carbon dioxide ($CO_2$), hydrogen ($H_2$), water ($H_2O$), propane and lighter hydrocarbons ($C_3$+), nitrogen ($N_2$), and the like. Additionally, the raw gas stream can comprise one or more undesirable components (i.e., contaminants) that should be removed prior to utilizing the raw gas stream as fuel. Sulfur compounds, such as, for example, hydrogen sulfide (H2S), carbonyl sulfide (COS), carbon disulfide ($CS_2$), and even organosulfur compounds such as mercaptans and various thiophenic compounds are a few examples of common contaminants found in the raw gas stream. Other examples of contaminants typically present in the raw gas stream can include, but are not limited to ammonia ($NH_3$), hydrochloric acid (HCl), and hydrogen cyanide (HCN).

Table 1, below, summarizes the composition of the raw gas stream in the input conduit according to one embodiment of the present invention.

TABLE 1

| Component | Component in Raw Gas Stream (based on total stream volume) | | |
|---|---|---|---|
| | Broad Range | Intermediate Range | Narrow Range |
| $H_2$ | 8-50 vol % | 10-40 vol % | 15-35 vol % |
| CO | 10-75 vol % | 15-60 vol % | 25-50 vol % |
| $CO_2$ | 1-40 vol % | 5-30 vol % | 7-20 vol % |
| $H_2O$ | 4-40 vol % | 8-30 vol % | 10-25 vol % |
| $H_2S$ | 0.001-5 vol % | 0.1-2.5 vol % | 0.5-2 vol % |
| $CH_4$ | 0.05-10 vol % | 0.1 to 7.5 vol % | 0.5 to 5.0 vol % |
| COS | 100-5,000 ppmv | 200-2,500 ppmv | 350-1,500 ppmv |
| HCl | 50-2,000 ppmv | 100-1,500 ppmv | 250-1,000 ppmv |
| $NH_3$ | 50-2,000 ppmv | 100-1,500 ppmv | 250-1,000 ppmv |
| Other (total) | <2.5 vol % | <2.0 vol % | <1 vol % |

As depicted in FIG. 1, at least a portion of the gas stream exiting the gas source in a conduit can be routed into one of several independent adsorption reactors, wherein the stream can be contacted with a sorbent to remove at least a portion of at least one contaminant from the incoming particulate-free gas stream. In one embodiment, the raw gas stream is not cooled prior to entering an adsorption reactor and can have a temperature that is within about 200° C., about 100° C., or 50° C. of the temperature of the raw gas stream exiting the gas source. Generally, the raw gas stream entering a sorption zone can have a temperature in the range of from about 150 to about 700° C., about 250 to about 600° C., or 350 to 450° C. and a pressure in the range of from about 100 to about 750 psig, about 250 to about 600 psig, or 350 to 450 psig.

In general, the sorbent employed in adsorption/regenerator can be any sufficiently regenerable zinc-oxide-based sorbent composition having sufficient contaminant removal ability. While described below in terms of its ability to remove sulfur contaminants from an incoming gas stream, it should be understood that the sorbent of the present invention can also have significant capacity to remove one or more other contaminants, such as, for example, one or more of the contaminants listed above.

In one embodiment of the present invention, the sorbent employed in an adsorption zone can comprise zinc and a promoter metal component. The promoter metal component can comprise one or more promoter metal selected from the group consisting of nickel, cobalt, iron, manganese, tungsten, silver, gold, copper, platinum, zinc, tine, ruthenium, molybdenum, antimony, vanadium, iridium, chromium, palladium, and mixtures thereof. In one embodiment, at least a portion of the promoter metal component is present in a reduced-valence state. The valence reduction of the promoter metal component can be achieved by contacting the sorbent with a hydrogen-containing stream, such as a synthesis gas.

In one embodiment of the present invention, the reduced-valence promoter metal component can comprise, consist of, or consist essentially of, a substitutional solid metal solution characterized by the formula: $M_A Zn_B$, wherein M is the promoter metal and A and B are each numerical values in the range of from about 0.01 to about 0.99. In the above formula for the substitutional solid metal solution, A can be in the range of from about 0.70 to about 0.98 or 0.85 to 0.95 and B can be in the range of from about 0.03 to about 0.30 or 0.05 to 0.15. In one embodiment, A+B=1.

Substitutional solid solutions are a subset of alloys that are formed by the direct substitution of the solute metal for the solvent metal atoms in the crystal structure. For example, it is believed that the substitutional solid metal solution $M_A Zn_B$ is formed by the solute zinc metal atoms substituting for the solvent promoter metal atoms. Three basic criteria exist that favor the formation of substitutional solid metal solutions: (1) the atomic radii of the two elements are within 15 percent of each other; (2) the crystal structures of the two pure phases are the same; and (3) the electronegativities of the two components are similar. The promoter metal (as the elemental metal or metal oxide) and zinc (as the elemental metal or metal oxide) employed in the sorbent described herein typically meet at least two of the three criteria set forth above. For example, when the promoter metal is nickel, the first and third criteria, are met, but the second is not. The nickel and zinc metal atomic radii are within 10 percent of each other and the electronegativities are similar. However, nickel oxide (NiO) preferentially forms a cubic crystal structure, while zinc oxide (ZnO) prefers a hexagonal crystal structure. A nickel zinc solid solution retains the cubic structure of the nickel oxide. Forcing the zinc oxide to reside in the cubic structure increases the energy of the phase, which limits the amount of zinc that can be dissolved in the nickel oxide structure. This stoichiometry control manifests itself microscopically in a 92:8 nickel zinc solid solution ($Ni_{0.92}Zn_{0.08}$) that is formed during reduction and microscopically in the repeated regenerability of sorbent.

In addition to zinc and the promoter metal, the sorbent employed can further comprise a porosity enhancer (PE) and an aluminate. The aluminate can comprise a promoter metal-zinc aluminate substitutional solid solution characterized by the formula: $M_Z Zn_{(1-Z)} Al_2 O_4$, wherein M is the promoter metal and Z is in the range of from 0.01 to 0.99. The porosity enhancer, when employed, can be any compound which ultimately increases the macroporosity of the sorbent. In one embodiment, the porosity enhancer can comprise perlite. Examples of sorbents suitable for use in the current invention and methods of making these sorbents are described in detail in U.S. Pat. Nos. 6,429,170 and 7,241,929, the entire disclosures of which are incorporated herein by reference.

Table 2, below, provides the composition of a sorbent employed in an adsorption/regeneration reactor according to an embodiment of the present invention where reduction of the sorbent is carried out immediately prior or simultaneous to commencing the adsorption process.

TABLE 2

| | Reduced Sorbent Composition (wt %) | | | |
|---|---|---|---|---|
| Range | ZnO | $M_A Zn_B$ | PE | $M_Z Zn_{(1-Z)} Al_2 O_4$ |
| Broad | 10-90 | 5-80 | 2-50 | 2-50 |
| Intermediate | 20-60 | 10-60 | 5-30 | 5-30 |
| Narrow | 30-40 | 30-40 | 10-20 | 10-20 |

In an alternative embodiment where the sorbent is not reduced prior to entering adsorption mode, the promoter metal component can comprise a substitutional solid metal oxide solution characterized by the formula $M_X Zn_Y O$, wherein M is the promoter metal and X and Y are in the range of from about 0.01 to about 0.99. In one embodiment, X can be in the range of from about 0.5 to about 0.9, about 0.6 to about 0.8, or 0.65 to 0.75 and Y can be in the range of from about 0.10 to about 0.5, about 0.2 to about 0.4, or 0.25 to 0.35. In general, X+Y=1.

Table 3, below, provides the composition of an unreduced sorbent employed in at least one of the adsorption reactors in FIG. 1, according to an embodiment where the sorbent is not reduced prior to the reactor entering adsorption mode.

TABLE 3

| | Unreduced Sorbent Composition (wt %) | | | |
|---|---|---|---|---|
| Range | ZnO | $M_X Zn_Y O$ | PE | $M_Z Zn_{(1-Z)} Al_2 O_4$ |
| Broad | 10-90 | 5-70 | 2-50 | 2-50 |
| Intermediate | 20-70 | 10-60 | 5-30 | 5-30 |
| Narrow | 35-45 | 25-35 | 10-20 | 10-20 |

As mentioned above, when an unreduced sorbent composition is contacted with a hydrogen containing gas in one of the adsorption reactors, reduction of the sorbent can take place in the reactor. Therefore, the initial sorbent contacted with the raw gas stream in an adsorption reactor can be a mixture of reduced sorbent (Table 2) and unreduced sorbent (Table 3).

In general, the incoming particulate-free input gas stream can contact the initial sorbent in an adsorption reactor at a temperature in the range of from about 150 to about 650° C., about 225 to about 550° C., or 325 to 475° C. and a pressure in the range of from about 100 to about 750 psig, about 250 to 575 psig, or 350 to 450 psig. At least a portion of sulfur-containing compounds (and/or other contaminants) in the raw gas stream can be adsorbed by the sorbent, thereby creating a sulfur-depleted product gas stream and a sulfur-laden sorbent. In one embodiment, the sulfur-removal efficiency in one of the sorption zones can be greater than about 85 percent, greater than about 90 percent, greater than about 95 percent, greater than about 98 percent, or greater than 99 percent.

As depicted in FIG. 1, at least a portion of the contaminant-depleted product gas stream can exit an adsorption reactor via an exit conduit. In one embodiment, the product gas stream can comprise less than about 50, less than about 20, less than about 10, less than about 5, or less than 1 ppmv $H_2S$. In addition, the product gas stream can comprise less than about 20, less than about 10, less than about 5, or less than 2 ppmv of HCl and/or COS. This is in contrast to conventional sulfur removal sorbents, which are often incapable of effectively removing sulfur-containing compounds such as $H_2S$ and COS simultaneously with other contaminants such as HCl.

As shown in FIG. 1, the contaminant-depleted product gas stream can then be routed to a product gas user. Product gas user can comprise any industrial, commercial, or residential use or application of a contaminant-depleted product gas stream. In one embodiment, product gas user can comprise an industrial gas turbine located in a facility used to co-produce steam and electricity.

In some embodiments of the present invention, the sulfur-laden sorbent can have a sulfur loading in the range of from about 1 to about 27, about 3 to about 26, about 5 to about 25, or 10 to 20 weight percent. At least a portion of the sulfur-laden sorbent can be dried prior to regeneration by flowing an inert gas purge stream having a temperature in the range of from about 100 to about 550° C., about 150 to about 500° C., or 200 to 475° C. through the sorbent for a time period of at least about 15 minutes, or a time period in the range of from about 30 minutes to about 100 hours, about 45 minutes to about 36 hours, or 1 hour to 12 hours. This heated, inert purge gas enters the regeneration zone at a pressure in the range of from 20 psig to 300 psgi, but preferentially at a pressure within this range that minimizes the effects of pressure cycling on the sorbent and the re-pressurization time required following regeneration and before re-entering adsorption mode. Following the purge step, the resulting dried, sulfur-laden sorbent is then regenerated.

In some embodiments of the present invention, regeneration mode can employ a regeneration process capable of removing least a portion of the sulfur (or other adsorbed contaminants) from the sulfur-laden sorbent via contact with a regeneration gas stream under sorbent regeneration conditions. In one embodiment, the regeneration gas stream entering a reactor under regeneration mode can comprise an oxygen-containing gas stream, such as, for example, air (e.g., about 21 volume percent oxygen). In another embodiment, the regeneration gas stream may consist of a minor portion of air (or $O_2$) in an inert gas environment, where the inert gas may comprise, for example, $N_2$ or $CO_2$. In another embodiment, the regeneration gas stream can be an oxygen-enriched gas stream comprising at least about 50, at least about 75, at least about 85, or at least 90 volume percent oxygen. In yet another embodiment, the regeneration gas stream can comprise a substantially pure oxygen stream.

In some embodiments of the present invention, the regeneration process employed can be a step-wise regeneration process. In general, a step-wise regeneration process includes adjusting at least one regeneration variable from an initial value to a final value in two or more incremental adjustments (i.e., steps). Examples of adjustable regeneration variables can include, but are not limited to, temperature, pressure, and regeneration gas flow rate. In one embodiment, the temperature in regeneration zone can be increased by a total amount that is at least about 75° C., at least about 100° C., or at least 150° C. above an initial temperature, which can be in the range of from about 250 to about 650° C., about 350 to about 600° C., or 400 to 575° C. In another embodiment, the regeneration gas flow rate can be adjusted so that the standard gas hourly space velocity (SGHSV) of the regeneration gas in contact with the sorbent can increase by a total amount that is at least about 1,000, at least about 2,500, at least about 5,000, or at least 10,000 volumes of gas per volume of sorbent per hour (v/v/h or h−1) above an initial SGHSV value, which can be in the range of from about 100 to about 100,000 h−1, about 1,000 to about 80,000 h−1, or 10,000 to 50,000 h−1.

In some embodiments of the present invention, the size of the incremental adjustments (i.e., the incremental step size) can be in the range of from about 2 to about 50, about 5 to about 40, or 10 to 30 percent of magnitude of the desired overall change (i.e., the difference between the final and initial values). For example, if an overall temperature change of about 150° C. is desired, the incremental step size can be in the range of from about 3 to about 75° C., about 7.5 to about 60° C., or 15 to 45° C. In another embodiment, the magnitude of the incremental step size can be in the range of from about 2 to about 50%, about 5 to about 40%, or to 30% of the magnitude of the initial variable value. For example, if the initial regeneration temperature is 250° C., the incremental step size can be in the range of from about 5 to about 125° C., about 12.5 to about 100° C., or 25 to 75° C. In general, successive incremental steps can have the same incremental step sizes, or, alternatively, one or more incremental step sizes can be greater than or less than the incremental step size of the preceding or subsequent steps.

In one embodiment of the present invention, subsequent adjustments to the regeneration variable(s) can be carried out at predetermined time intervals. For example, adjustments can be made after time intervals in the range of from about 1 minute to about 45 minutes, about 2 minutes to about 30 minutes, or 5 to 20 minutes. In another embodiment, the adjustments can be made based on the value(s) of one or more "indicator" variable(s). An indicator variable is a variable in the system monitored to determine the progress of the sorbent regeneration. Examples of indicator variables can include, but are not limited to, sorbent carbon or sulfur loading, regeneration sorbent bed temperature, regeneration zone temperature profile (i.e., exotherm), and off-gas stream composition. In one embodiment, the sulfur dioxide (SO2) concentration in the off-gas stream is monitored by a gas analyzer to determine when the flow rate of the regeneration gas and/or the regeneration temperature are incrementally adjusted.

The regeneration process can be carried out in a regeneration zone until at least one regeneration end point is achieved. In one embodiment, the regeneration end point can be the achievement of a desired value for one or more of the adjusted regeneration variables. For example, the regeneration process can be carried out until the temperature achieves a final value in the range of from about 300 to about 800° C., about 350 to about 750° C., or 400 to 700° C. or the SGHSV reaches a final value in the range of from about 1,100 to about 110,000 h−1, about 5,000 to about 85,000 h−1, or 25,000 to 60,000 h−1. In another embodiment, the regeneration process can be finished after a predetermined number of variable adjustments. For example, the regeneration process can be carried out long enough for at least 1 or in the range of from about 2 to about 8 or 3 to 5 incremental adjustments to be made. In yet another embodiment, the regeneration process can be carried out until a final value of the selected indicator variable is achieved. For example, the regeneration process can be carried out until the concentration of SO2 in the off-gas exiting the regeneration reactor declines to a value less than about 1 volume percent, less than about 0.5 volume percent, less than about 0.1 volume percent, or less than 500 ppmv. Regardless of the specific endpoint selected, the entire length of the regeneration process can be less than about 100 hours, or in the range of from about 30 minutes to about 48 hours, about 45 minutes to about 24 hours, or 1.5 to 12.5 hours.

In one embodiment, the above-described regeneration process can have a regeneration efficiency for the sorbent of at least about 75 percent, at least about 85 percent, at least about 90 percent, at least about 95 percent, at least about 98 percent, or at least 99 percent. The regenerated sorbent can have a sulfur loading that is less than about 10 weight percent, or in the range of from about 0.05 to about 6 weight percent, or 0.1 to 4 weight percent.

In general, regenerating at least a portion of the above-described sorbent can result in the formation of one or more sorbent-damaging compounds. A sorbent-damaging compound can be any compound adsorbed into or onto the sorbent that adversely impacts the sorbent's ability to adsorb sulfur from the incoming gas stream in a sorption zone. Examples of sorbent-damaging compounds can include, but are not limited to, zinc oxysulfate and zinc silicate. In one embodiment of the present invention, the regenerated sorbent exposed to the above-described regeneration process in a regeneration zone can comprise less than expected amounts of sorbent-damaging compounds as compared to traditional sorbents exposed to conventional regeneration processes. For example, the regenerated sorbent exiting a regeneration zone via an exit conduit can comprise less than about 20 weight percent sorbent-damaging compounds or in the range of from 0 to about 15 weight percent, or 0 to about 10 weight percent, or 0 to 5 weight percent of sorbent-damaging compounds.

Referring back to FIG. 1, the off-gas stream exiting a reactor in regeneration mode can subsequently be routed to an off-gas user. Off-gas user can comprise any unit capable of processing the off-gas stream, such as, for example, a Claus sulfur processing unit. In one embodiment of the present invention, the off-gas stream exiting a regeneration zone via an exit conduit can comprise at least about 5, at least about 10, at least about 20, or at least 25 volume percent $SO_2$. In one embodiment, the off-gas stream comprises less $H_2S$ than in the raw gas stream entering an adsorption zone via a conduit. In another embodiment, off-gas stream can comprise substantially no $H_2S$.

The following example is intended to be illustrative of one embodiment of the present invention in order to teach one of ordinary skill in the art to make and use the invention and is not intended to limit the scope of the invention in any way.

Example 1

An unreduced Zn-promoter metal sorbent (SZorb™ Generation IV sorbent commercially available from Sud-Chemie Inc. of Louisville, Ky.) was crushed and sieved to obtain 100+/200-mesh size particles. Fifteen grams of the crushed sorbent was combined with 45 grams of alundum and the resulting mixture was charged to a fixed bed, downflow reaction vessel. A raw gas stream, the composition of which is summarized in Table 5 below, was passed through the reaction vessel and contacted with the sorbent mixture at a temperature of 420° C. and a pressure of 408 psig.

TABLE 5

Raw Gas Composition

| Component | Amount (vol %) | Component | Amount (vol %) |
|---|---|---|---|
| CO | 38.6 | $N_2$ | 1.3 |
| $H_2$ | 25.6 | Ar | 0.9 |
| $CO_2$ | 14.6 | COS | 0.2 |
| $H_2O$ | 15.7 | HCl | 0.02 |
| $CH_4$ | 1.7 | $NH_3$ | 0.07 |
| $H_2S$ | 1.2 | HCN | 0.01 |

The concentration of sulfur compounds (i.e., $H_2S$ and COS) in the product gas stream exiting the reaction vessel was continuously monitored using an online sulfur analyzer (Model 902D2, available from Galvanic Applied Sciences USA, Inc. of Lowell, Mass.), while the concentrations of the remaining compounds were measured with an online mass spectrometer (EcoSys™, commercially available from European Spectrometry Systems, Ltd. of Northwich, Cheshire, United Kingdom). Sulfur "breakthrough" occurred after 1.5 hours when the concentration of sulfur compounds in the gas stream exiting the reaction vessel exceeded 0.1 volume percent (i.e., 1000 ppmv). Once breakthrough was observed, the flow of feed gas to the reaction vessel was stopped and several sulfur-laden sorbent samples from various locations throughout the sorbent bed were removed for subsequent analysis. The sulfur-laden sorbent had an average sulfur loading of 25.9 weight percent, as determined by X-ray fluorescence (XRF) analysis.

The sulfur-laden sorbent remaining in the reaction vessel was purged with a stream of nitrogen having a temperature of 400° C. and a flow rate of 100 mL/min to dry the sorbent prior to regeneration. After one hour, regeneration was initiated by introducing a stream of air having a flow rate of 100 mL/min to the sorbent bed, which had an initial temperature of 400° C. Both the regeneration temperature (in 30-50° C. increments) and the air flow rate (in 100 to 250 mL/min increments) were adjusted to maintain reasonably consistent concentrations of sulfur dioxide in the off-gas stream exiting the reaction vessel. When $SO_2$ levels declined substantially, the regeneration process was stopped and several regenerated sorbent samples were taken at various locations throughout the bed. Subsequent XRF analysis showed the regenerated sorbent had an average sulfur loading of 3.52 weight percent and the XRD analysis revealed the average combined amount of zinc oxysulfate and zinc silicate (i.e., sorbent-damaging compounds) to be 10.1 percent.

Example 2

Testing was performed utilizing multiple swing-type reactors to remove contaminants from a sour off-gas refinery gas feed. These reactors utilized a catalyst of a pellet or bead-type nature in a fixed (rather than fluidized) bed. The pilot scale tests confirmed that the process worked and that the chemistry was sound. However, the fixed beds of catalyst inside of the reactors required an extended time for regeneration between cycles.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

Definitions

As used herein, the term "indicator variable" refers to a variable monitored to determine the progress of the sorbent regeneration.

As used herein, the term "reduced-valence promoter metal component" refers to a promoter metal component having a valence with is less than the valence of the promoter metal component in its common oxidized state.

As used herein, the term "regeneration conditions" refer to conditions necessary to remove at least a portion of adsorbed sulfur from the sulfur-laden sorbent.

As used herein, the term "regeneration efficiency" refers to the ability of a regeneration zone to remove one or more adsorbed compounds from an incoming sorbent. Regeneration efficiency can be expressed according to the following formula: [(sulfur loading of sulfur-laden sorbent×mass of sulfur-laden sorbent entering regeneration zone)−(sulfur loading of regenerated sorbent×mass of regenerated sorbent exiting regeneration zone)/(sulfur loading of sulfur-laden sorbent×mass of sulfur-laden sorbent entering regeneration zone), expressed as a percentage.

As used herein, the terms "sorb" or "sorption" refer to any type or combination of physical and/or chemical adsorption and/or absorption.

As used herein, the term "sorbent-damaging compound" refers to a compound adsorbed into or onto the sorbent that adversely impacts the sorbent's ability to remove sulfur or other contaminants from a fluid stream.

As used herein, the term "standard conditions" refers to a pressure of 1 atmosphere and a temperature of 15.5° C.

As used herein, the term "standard gas hourly space velocity" or "SGHSV" refers to the gas hourly space velocity of a gas stream measured at standard conditions.

As used herein, the term "sulfur loading" refers to the average weight percent of sulfur adsorbed onto a sorbent.

As used herein, the term "sulfur removal efficiency" refers to the ability of a sorbent to remove sulfur compounds or other contaminants from an incoming fluid stream. Sulfur removal efficiency can be calculated by the following formula: (mass flow rate of sulfur compounds entering a sorption zone in a fluid stream–mass flow rate of sulfur compounds exiting a sorption zone in a fluid stream)/(mass flow rate of sulfur compounds entering a sorption zone in the feed stream), expressed as a percentage.

For the purposes of this disclosure, the term "syngas" is synonymous with synthesis gas or synthetic gas, the term "gas" is synonymous with methane, natural gas, as well as gasoline or any other liquid hydrocarbon fuel.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed and certain features of the invention may be utilized independently, all as would be apparent to one skilled in the art after having the benefit of this description of the invention. Changes may be made in the elements described herein without departing from the spirit and scope of the invention as described in the following claims.

We claim:

1. A system for contaminant removal from a gas, comprising:
    (a) at least two reactors capable of operating in parallel to remove contaminants from a gas, wherein each reactor comprises a self-contained, fluidized sorbent bed capable of removing contaminants, and wherein each reactor is capable of regenerating said fluidized sorbent bed to produce an off-gas and a regenerated sorbent;
    (b) at least two in-line sensors capable of measuring the levels of specific gaseous compounds entering or leaving said reactors;
    (c) an electronic control system that controls the cycling of said reactors between adsorption and regeneration mode, said control system comprising:
        1) a computer processor that processes data acquired from said in-line sensors according to defined parameters, wherein said parameters are programmed into a machine language that is stored on a computer-readable storage medium, and wherein said machine language provides an instruction set to said processor that allows it to propagate a signal;
        2) at least two valves that receive the signals from said processor to control the flow of the various process gases into the reactors while minimizing changes in temperature and pressure and moderating the rate of said changes to decrease the attrition rate of the sorbent; wherein the control system is configured to maintain each reactor at a temperature above about 100° C. and a pressure above about 20 psig.

2. The system of claim 1, wherein the valves are electrically-actuated double block solenoid valves.

3. The system of claim 1, wherein the control system, for controlling the cycling of said reactors between adsorption and regeneration mode, is configured to:
    (A) contact a contaminant-laden input gas stream with the initial sorbent in at least one of said reactors, thereby producing a contaminant-depleted product gas stream and a contaminant-laden sorbent;
    (B) discontinue the flow of said input gas stream into at least one of the reactors, then contact at least a portion of the contaminant-laden sorbent with an inert purge gas, thereby removing at least a portion of the moisture from the sorbent and produce a dried contaminant-laden sorbent; and
    (C) contact at least a portion of the contaminant-laden sorbent with a regeneration gas stream, thereby producing a regenerated sorbent and an off-gas stream.

4. The system of claim 3, wherein the control system is configured to control a simultaneous opening and closing of the valves, controlling the flow of the input gas stream, the inert purge gas, and the regeneration gas stream to and from the at least two reactors, to moderate the rate of change in temperature and pressure within the reactors.

5. The system of claim 3, wherein the control system is configured, during (A), to maintain the temperature within the reactor at a temperature in the range from about 285° C. to about 455° C. and a pressure in the range from about 300 psig to about 800 psig.

6. The system of claim 3, wherein the control system is configured, during (C), to maintain the temperature within the reactor at a temperature in the range from about 400° C. to about 565° C. and a pressure in the range from about 20 psig to about 300 psig.

7. The system of claim 3, wherein the control system is configured, during (B), to maintain the temperature within the reactor at a temperature in the range from about 285° C. to about 455° C. and a pressure in the range from about 300 psig to about 800 psig.

8. The system of claim 3, wherein, following (C), the control system is configured to cyclically repeat steps (A) through (C).

* * * * *